Patented Sept. 25, 1951

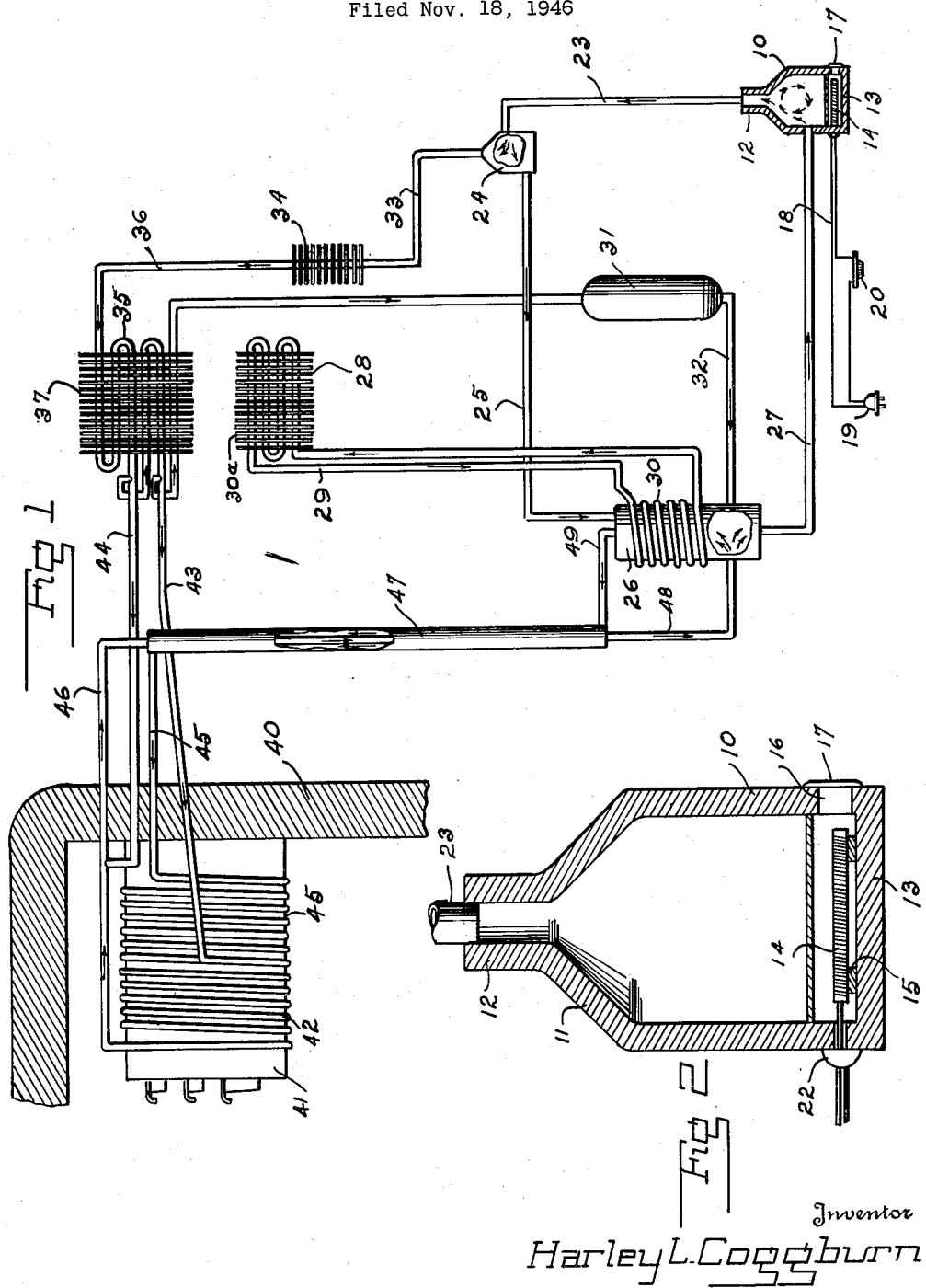

2,568,789

UNITED STATES PATENT OFFICE 2,568,789

GENERATOR FOR ABSORPTION REFRIGERATORS

Harley Lee Coggburn, Big Bear Lake, Calif.

Application November 18, 1946, Serial No. 710,531

1 Claim. (Cl. 62—119.5)

This invention relates to a refrigerator using an electric heating element which is enclosed in a vessel or heating pot of refractory brick. One of the main features of this invention resides in the fact that said element is installed in such a manner that it can be removed or exchanged easily and at short notice. The brick enclosure or pot is used for the purpose of utilizing completely the heat developed by said element. For easy removal of said element, a door about 6 inches wide, opened from the outside, is provided on the pot which is about 12 inches in diameter and the wiring from the element has two terminals adapted to fit in sockets exteriorly of the housing for the refrigerator. The object of having the heating element quickly removable is to avoid delay in service and for replacing it with another similar element.

This easy replacement is considered necessary to preserve the fresh condition of food articles deposited in the refrigerator and to prevent their spoiling.

This refrigerator also includes a rheostat intended to control the different temperatures and an automatic thermostat with a switch, for changing the temperature required for different kinds of articles stored therein.

These and other objects and advantages will be understood from the subjoined description with the aid of the attached drawing.

Figure 1 is a diagrammatic representation of the arrangement and location of the different instrumentalities employed together with their conduits and wiring; and Figure 2 is a vertical section of the heating pot in larger scale.

The heating pot 10 is made of refractory brick and preferably cylindrical, tapering towards the top as at 11 and terminating with a narrow neck 12. Near the bottom 13 is installed a coiled wire 14, constituting the heating element which is resting on insulation blocks 15 upon the bottom 13. The coil wire or heating element 14 is inserted into the pot 10 through the opening 16 which is normally closed by a door 17, easily accessible from the outside.

Through the diametrically opposite side of the pot 10 two electric current conductors 18 extend outwardly terminating with a plug 19, adapted to fit a socket at the source of electric current. These conductors are enclosed in a clip 22 preferably of insulating material and are carried thru the brick pot wall 10 for detachable connection with the heating element inside the pot. The electric conductor 18 preferably includes a rheostat 20. Said rheostat is arranged for six to eight settings ranging from 150 watts to 1600 watts. By this means the refrigerator can be set for comparatively low to very high temperatures as required.

A suitable fluid such as ammonia water fills the pot. This liquid can be heated by the electric element at the bottom of the pot and is forced upwardly to a conduit 23 which leads to a separator 24 for separating vapor from the liquid. In the separator 24 the ammonia vapors separate from the water solvent and the water is led thru a conduit 25 to an absorber 26 from which it returns thru a conduit 27 to the heating pot 10, wherein the process is repeated.

A cooling system consists of radiator sections which are provided with a piping conduit 29 which is coiled at 30 around the absorber 26 and has coils 30a within the radiator disks 28.

A reserve vessel 31 supplies liquid to the lower end of the absorber 26 thru the conduit 32.

From the upper end of the separator 24 the vapors rise thru the conduit 33, passing thru the rectifier 34, into the coils 35 by way of conduit 36, said coils being contained in the condenser 37. The lower part of condenser 37 is connected with a storage tank 31 for a suitable inert gas such as hydrogen. In the event that the atmospheric temperature rises, a higher presure within the system will be necessary for condensation of ammonia to take place within the condenser. This higher pressure is obtained by the fact that when the temperature increases a portion of the ammonia will pass through the condenser without being liquified and will pass through the conduit leading to the storage vessel 31, into the vessel and displace therefrom the stored hydrogen which passes through conduit 32 to the absorber.

The instrumentality so far described, is all enclosed in a chamber separated from the refrigerator proper 40 which contains an evaporator or froster 41 which is preferably cylindrical in shape and one end of which is enclosed in a set of coils 42 which is connected by way of conduit 43, to one end of the coils 35 in the condenser 37, while the other end of the coil 35 connects thru conduit 44, with a second set of coils 45 around the evaporator 41. The two sets of coils 42 and 45, around the evaporator 41 have separate conduits 45 and 46 respectively, which both lead into a heat exchanger 47. Said heat exchanger 47 connects with the lower end of the absorber 26 by means of conduit 48 being a continuation of conduit 46 from coil 42 of the evaporator; while another conduit 49 leads from the absorber 26 to the heat exchanger 47 and continues by way of the other coil 45 of the evaporator 41, thus completing the circuit. Hydrogen gas is admitted into the right hand end of the coil in the evaporator through the conduit 45 and comes into intimate contact with the liquid ammonia introduced into the evaporator. The ammonia evaporates and diffuses into the hydrogen which evaporation results in absorption of heat from the chamber 41. During its passage through the heat exchanger 47 the cold gaseous mixture in conduit 46 absorbs heat from the hydrogen in the exchange 47 thus cooling the hydrogen before it is admitted to the evaporator.

It will now be seen that the evaporator 41, aided by said coils 42 and 45, will cause ice to be formed thereon, and thus provide the needed low temperature in the refrigerator.

The simplicity and easy handling of this refrigerator will be clear from this description since no part need be changed or replaced to keep it in working order but only the heating element 14 itself, which is easily accessible thru the door 17 as the heating pot 10 and the cost of which would not be over $3.00.

It is to be understood that the invention as herein disclosed may be varied from the details described and shown without departure from the spirit of the subjoined claim.

I claim:

In a refrigeration system of the absorption type, a generator in the circulatory system thereof said generator comprising a liquid tight housing of refractory material, the housing having a top outlet, a chamber in the bottom of the housing, the chamber having an opening leading thereinto from outside the generator housing, an electric resistance heating unit insertable into and sealed in the chamber through said opening, an electric current conductor leading into the chamber upon the side thereof opposite from the opening, the said heating unit and said current conductor being connected by a detachable clip and the latter extending through the wall of the said housing.

HARLEY LEE COGGBURN.

REFERENCES CITED

The following references are of record in the file of this patent:

UNITED STATES PATENTS

| Number | Name | Date |
| --- | --- | --- |
| 839,343 | Vogel | Dec. 25, 1906 |
| 856,736 | Shoenberg | June 11, 1907 |
| 2,035,499 | Nelson | Mar. 31, 1936 |
| 2,169,214 | Bergholm | Apr. 15, 1939 |
| 2,202,373 | Dahl | May 28, 1940 |

FOREIGN PATENTS

| Number | Country | Date |
| --- | --- | --- |
| 553,292 | Great Britain | May 14, 1943 |
| 586,152 | Germany | Sept. 28, 1933 |